US009340098B2

(12) United States Patent
Choi (10) Patent No.: US 9,340,098 B2
(45) Date of Patent: *May 17, 2016

(54) TRANSMISSION SYSTEM OF HYBRID ELECTRIC VEHICLE

(71) Applicant: Hyundai Motor Company, Seoul (KR)

(72) Inventor: Kum Lim Choi, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/497,946

(22) Filed: Sep. 26, 2014

(65) Prior Publication Data

US 2015/0151626 A1    Jun. 4, 2015

(30) Foreign Application Priority Data

Dec. 4, 2013    (KR) .................. 10-2013-0150238

(51) Int. Cl.
| | |
|---|---|
| *F16H 3/72* | (2006.01) |
| *B60K 6/365* | (2007.10) |
| *B60K 6/445* | (2007.10) |
| *B60K 6/387* | (2007.10) |

(52) U.S. Cl.
CPC .............. *B60K 6/365* (2013.01); *B60K 6/387* (2013.01); *B60K 6/445* (2013.01); *Y10S 903/91* (2013.01)

(58) Field of Classification Search
None
See application file for complete search history.

(56) References Cited

U.S. PATENT DOCUMENTS

| | | | | |
|---|---|---|---|---|
| 6,155,364 | A  * | 12/2000 | Nagano et al. | 180/65.235 |
| 6,695,736 | B2 | 2/2004 | Takenaka | |
| 6,910,981 | B2 | 6/2005 | Minagawa et al. | |
| 7,063,637 | B2 * | 6/2006 | Yamauchi et al. | 475/5 |
| 7,086,977 | B2 * | 8/2006 | Supina et al. | 475/5 |
| 7,416,501 | B2 * | 8/2008 | Holmes et al. | 475/5 |
| 7,972,237 | B2 * | 7/2011 | Ota | 475/5 |
| 7,988,579 | B2 * | 8/2011 | Tabata et al. | 475/5 |
| 8,033,939 | B2 * | 10/2011 | Tabata et al. | 475/5 |
| 8,308,593 | B2 * | 11/2012 | Kumazaki et al. | 475/5 |
| 8,414,451 | B2 * | 4/2013 | Hisada et al. | 477/5 |
| 8,708,070 | B2 * | 4/2014 | Tsuchida et al. | 180/65.22 |
| 8,727,932 | B2 * | 5/2014 | Shibata et al. | 475/324 |
| 8,734,281 | B2 * | 5/2014 | Ai et al. | 475/5 |
| 2009/0023529 | A1 * | 1/2009 | Sanji et al. | 475/5 |
| 2009/0098969 | A1 * | 4/2009 | Tabata et al. | 475/5 |
| 2013/0090798 | A1 * | 4/2013 | Fukushiro | 701/22 |
| 2015/0099605 | A1 * | 4/2015 | Choi et al. | 477/5 |

FOREIGN PATENT DOCUMENTS

| | | |
|---|---|---|
| JP | 2002-052944 A | 2/2002 |
| JP | 2003-063260 A | 3/2003 |
| JP | 2004-284550 A | 10/2004 |
| JP | 2010-149707 A | 7/2010 |
| KR | 10-2011-0049398 A | 5/2011 |
| KR | 10-2011-0049402 A | 5/2011 |

* cited by examiner

*Primary Examiner* — Dirk Wright
(74) *Attorney, Agent, or Firm* — Morgan, Lewis & Bockius (57) ABSTRACT

A transmission system of a hybrid electric vehicle may include an input shaft arranged to receive torque of an engine, a first motor/generator operable as a motor or a generator, a second motor/generator operable as a motor or a generator and directly connected to an output gear, and a planetary gear set having a first rotation element directly connected to the first motor/generator and selectively connected to the input shaft, a second rotation element directly connected to the input shaft, and a third rotation element selectively connected to the output gear.

13 Claims, 8 Drawing Sheets

| mode | CL1 | CL2 |
|---|---|---|
| EV mode | | |
| starting of engine | ● | |
| continuous mode | ● | |
| power split mode | | ● |
| parallel mode | ● | ● |
| regenerative braking mode | | |

— · — · — MG1 Power
—— · · —— MG2 Power
— — — — Engine Power
———— Compound Power
—— · · · —— regenerative Power

TRANSMISSION SYSTEM OF HYBRID ELECTRIC VEHICLE

CROSS-REFERENCE TO RELATED APPLICATION

The present application claims priority to Korean Patent Application No. 10-2013-0150238 filed Dec. 4, 2013, the entire contents of which is incorporated herein for all purposes by this reference.

BACKGROUND OF THE INVENTION

1. Field of the Invention

The present invention relates to a transmission system of a hybrid electric vehicle. More particularly, the present invention relates to a transmission system of a hybrid electric vehicle that can achieve electric vehicle (EV) mode, continuous mode, power split mode, parallel mode and regenerative braking mode.

2. Description of Related Art

Generally, a hybrid vehicle is a vehicle which uses two different power sources efficiently.

Such a hybrid electric vehicle typically uses an engine and a motor/generator. The hybrid electric vehicle uses the motor/generator having relatively better low-speed torque characteristics as a main power source at a low-speed and uses an engine having relatively better high-speed torque characteristics as a main power source at a high-speed.

Since the hybrid electric vehicle stops operation of the engine using the fossil fuel and uses the motor/generator at a low-speed region, fuel consumption may be improved and exhaust gas may be reduced.

The power transmission system of a hybrid electric vehicle is classified into a single-mode type and a multi-mode type.

A torque delivery apparatus such as clutches and brakes for shift control is not necessary, but fuel consumption is high due to deterioration of efficiency at a high-speed region and an additional torque multiplication device is required for being applied to a large vehicle according to the single-mode type.

Since the multi-mode type has high efficiency at the high-speed region and is able to multiply torque autonomously, the multi-mode type can be applied to a full size vehicle.

Therefore, the multi-mode type instead of the single-mode type is applied as the power transmission system of a hybrid electric vehicle and is also under continuous investigation.

The power transmission system of the multi-mode type includes a plurality of planetary gear sets, a plurality of motor/generators each operated as a motor and/or a generator, a plurality of torque delivery apparatus (e.g., friction elements, synchronizer and so on) controlling rotation elements of the planetary gear sets, and a battery used as a power source of the motor/generators.

The power transmission system of the multi-mode type has different operating mechanisms depending on connections of the planetary gear sets, the motor/generators, and the torque delivery apparatus.

In addition, the power transmission system of the multi-mode type has different features such a durability, power delivery efficiency, and size depending on the connections of the planetary gear sets, the motor/generators, and the torque delivery apparatus. Therefore, designs for the connection structure of the power transmission system of a hybrid electric vehicle are also under continuous investigation to achieve robust and compact power transmission system having no power loss.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a transmission system of a hybrid electric vehicle having advantages of enhancing fuel economy by achieving electric vehicle (EV) mode, power split mode having high efficiency at low-speed driving, a parallel mode having high efficiency at high-speed driving, and a continuous mode suitable to a plug-in hybrid electric vehicle.

In addition, various aspects of the present invention are directed to providing a transmission system of a hybrid electric vehicle having further advantages of reducing capacity of a motor/generator and manufacturing cost by achieving power split mode.

In addition, various aspects of the present invention are directed to providing a transmission system of a hybrid electric vehicle having further advantages of maintaining efficiency at high-speed driving and low-speed driving and shortening a length thereof.

According to various aspects of the present invention, a transmission system of a hybrid electric vehicle may include an input shaft arranged to receive torque of an engine, a first motor/generator operable as a motor or a generator, a second motor/generator operable as a motor or a generator and directly connected to an output gear, and a planetary gear set including a first rotation element directly connected to the first motor/generator and selectively connected to the input shaft, a second rotation element directly connected to the input shaft, and a third rotation element selectively connected to the output gear.

The transmission system may further include a first clutch disposed between the first rotation element of the planetary gear set and the input shaft and selectively connecting the first rotation element to the input shaft.

The transmission system may further include a second clutch disposed between the third rotation element and the output gear and selectively connecting the third rotation element to the output gear.

The planetary gear set may be a single pinion planetary gear set, in which the first rotation element is a sun gear, the second rotation element is a planet carrier, and the third rotation element is a ring gear.

The transmission system may further include a reduction gear unit including an intermediate shaft disposed in parallel with the input shaft, an intermediate gear fixedly disposed on the intermediate shaft and engaged with the output gear, and a driving gear fixedly disposed on the intermediate shaft and engaged with a final reduction gear of a differential apparatus.

A torsion damper may be disposed between the engine and the input shaft.

The reduction gear unit may be configured to decelerate torque transmitted to the intermediate gear and to transmit the decelerated torque to the differential apparatus.

According to various aspects of the present invention, a transmission system of a hybrid electric vehicle may include an input shaft arranged to receive torque of an engine, a first motor/generator operable as a motor or a generator, a second motor/generator operable as a motor or a generator and directly connected to an output gear, a planetary gear set including a sun gear directly connected to the first motor/ generator and selectively connected to the input shaft, a planet carrier directly connected to the input shaft, and a ring gear selectively connected to the output gear, and a reduction gear unit transmitting torque transmitted to the output gear to a differential apparatus.

The transmission system may further include a first clutch disposed between the sun gear and the input shaft and selectively connecting the sun gear to the input shaft.

The transmission system may further include a second clutch disposed between the ring gear and the output gear and selectively connecting the ring gear to the output gear.

The reduction gear unit may include an intermediate shaft disposed in parallel with the input shaft, an intermediate gear fixedly disposed on the intermediate shaft and engaged with the output gear, and a driving gear fixedly disposed on the intermediate shaft and engaged with a final reduction gear of a differential apparatus.

A torsion damper may be disposed between the engine and the input shaft.

The reduction gear unit may be configured to decelerate torque transmitted to the intermediate gear and to transmit the decelerated torque to the differential apparatus.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Description of components that are not necessary for explaining various exemplary embodiments will be omitted, and the same constituent elements are denoted by the same reference numerals in this specification.

In the detailed description, ordinal numbers are used for distinguishing constituent elements having the same terms, and have no specific meanings.

Figure 1:
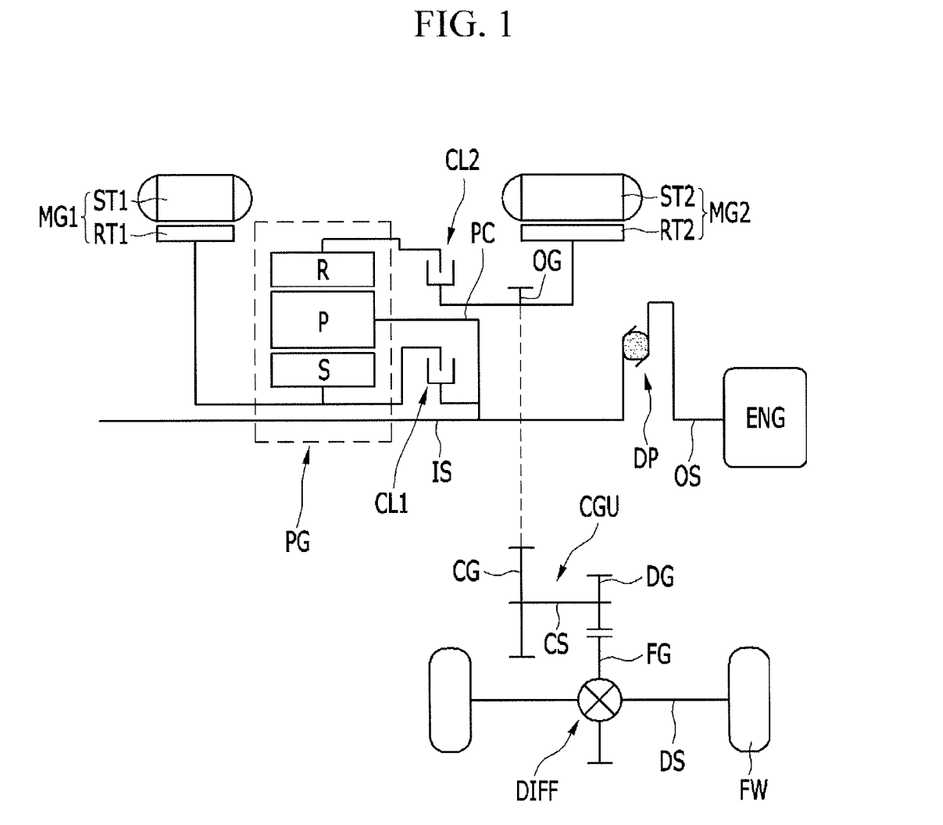
FIG. 1 is a schematic diagram of an exemplary transmission system of a hybrid electric vehicle according to the present invention.

FIG. 1 is a schematic diagram of a transmission system of a hybrid electric vehicle according to various embodiments of the present invention.

Referring to FIG. 1, a transmission system of a hybrid electric vehicle according to various embodiments of the present invention changes torques of an engine ENG and first and second motor/generators MG1 and MG2 according to a running state of a vehicle and outputs the changed torque through an output gear OG.

The transmission system includes an input shaft IS, a planetary gear set PG, first and second motor/generators MG1 and MG2, first and second clutches CL1 and CL2, and a reduction gear unit CGU.

The input shaft IS is arranged to receive driving torque of an engine ENG, and a torsion damper DP is disposed between an output shaft OS of the engine ENG and the input shaft IS.

The torsion damper DP is adapted to reduce or absorb torsional vibration generated between the output shaft OS of the engine ENG and the input shaft IS.

The torsion damper DP may be achieved by a rubber or a torsional spring that can absorb torsional impact, but is not limited thereto.

The planetary gear set PG is a single pinion planetary gear set and includes a sun gear S being a first rotation element, a planet carrier PC rotatably supporting a pinion P that is externally engaged with the sun gear S and being a second rotation element, and a ring gear R internally engaged with the pinion P and being a third rotation element.

The sun gear S is selectively connected to the input shaft IS, the planet carrier PC is directly connected to the input shaft IS, and the ring gear R is selectively connected to the output gear OG or to the second motor/generator MG2.

The first motor/generator MG1 is an independent power source and is operated as a motor and a generator. In the present exemplary transmission system, the first motor/generator MG1 is operated mainly as the generator and is operated as the motor when starting the engine.

In addition, the first motor/generator MG1 includes a first rotor RT1 and a first stator ST1. The first rotor RT1 is directly connected to the sun gear S of the planetary gear set PG and the first stator ST1 is fixed to a transmission housing H.

The second motor/generator MG2 is an independent power source and is operated as a motor and a generator. In the present exemplary transmission system, the second motor/generator MG2 is operated mainly as the motor.

In addition, the second motor/generator MG2 includes a second rotor RT2 and a second stator ST2. The second rotor RT2 is directly connected to the output gear OG and the second stator ST2 is fixed to the transmission housing H.

The first clutch CL1 is disposed between the sun gear S and the planet carrier PC of the planetary gear set PG and selectively connects the sun gear S to the input shaft IS.

The second clutch CL2 is disposed between the ring gear R of the planetary gear set PG and the output gear OG and selectively connects the ring gear R to the output gear OG.

Herein, the first clutch CL1 selectively connects the sun gear S and the planet carrier PC of the planetary gear set PG and causes the planetary gear set PG to be selectively operated as one rotation member. In addition, the second clutch CL2 transmits torque output from the ring gear R of the planetary gear set PG to the output gear OG.

The first and second clutches CL1 and CL2 may be conventional multi-plate friction elements of wet type that are operated by hydraulic pressure, and selectively connect a rotation element with another rotation element.

Meanwhile, the reduction gear unit CGU includes an intermediate shaft CS disposed in parallel with the input shaft IS between the input shaft IS and a differential apparatus DIFF. In addition, the reduction gear unit CGU further includes an intermediate gear CG disposed at one side of the intermediate shaft CS and engaged with the output gear OG, and a driving gear DG disposed at the other side of the intermediate shaft CS and engaged with a final reduction gear FG of the differential apparatus DIFF.

At this time, since a diameter of the intermediate gear CG is larger than that of the driving gear DG, the reduction gear unit CGU decelerates torque of the output gear OG and transmits the decelerated torque to the final reduction gear FG.

The differential apparatus DIFF, dividedly transmits the decelerated torque by gear ratios of the driving gear DG and the final reduction gear FG to left and right driving wheels FW through a drive shaft DS according to road state and running state.

Figure 2:
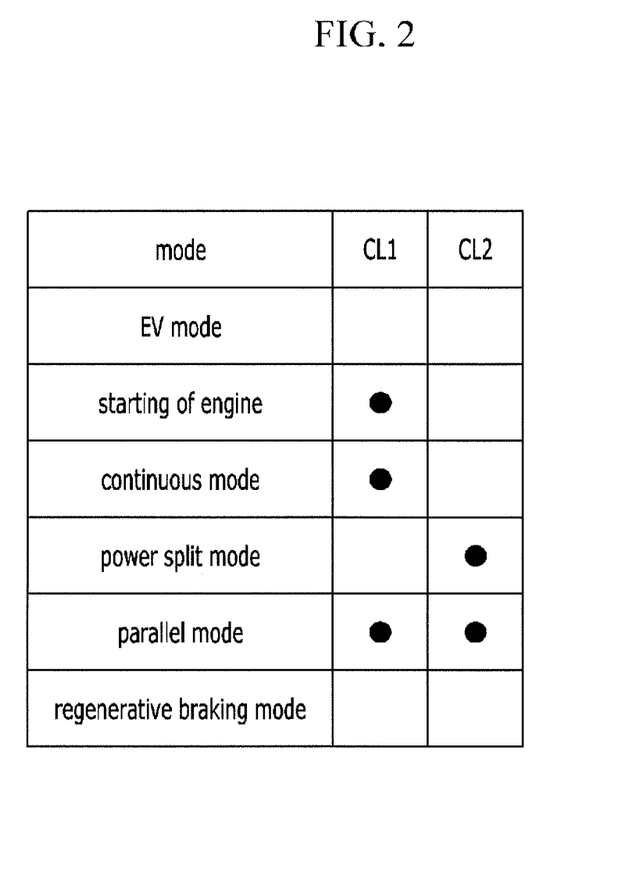
FIG. 2 is an operational chart of friction elements at each mode applied to an exemplary transmission system of the hybrid electric vehicle according to the present invention.

FIG. 2 is an operational chart of friction elements at each mode applied to a transmission system of the hybrid electric vehicle according to various embodiments of the present invention.

Referring to FIG. 2, a transmission system of the hybrid electric vehicle according to various embodiments of the present invention can achieve EV mode, starting of the engine, continuous mode, power split mode, parallel mode, and regenerative braking mode.

That is, both of the first and second clutches CL1 and CL2 are released at the EV mode and the regenerative braking mode, the first clutch CL1 is operated at the starting of the engine and the continuous mode, the second clutch CL2 is operated at the power split mode, and both of the first and second clutches CL1 and CL2 are operated at the parallel mode.

Hereinafter, flow of torque at each mode in a transmission system of the hybrid electric vehicle according to various embodiments of the present invention will be described, referring to FIG. 3 to FIG. 8.

Figure 3:
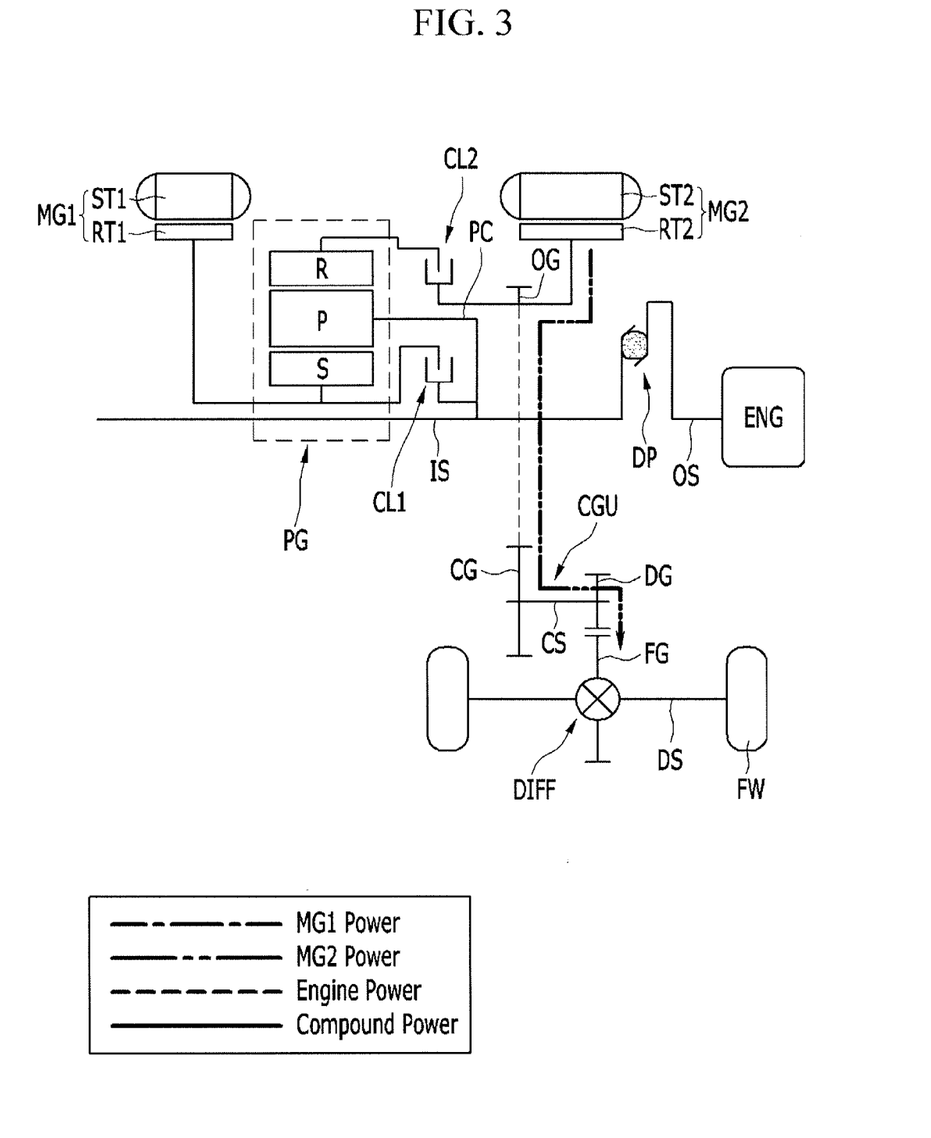
FIG. 3 is a schematic diagram for illustrating flow of power at electric vehicle (EV) mode in an exemplary transmission system of the hybrid electric vehicle according to the present invention.

FIG. 3 is a schematic diagram for illustrating flow of power at electric vehicle (EV) mode in a transmission system of the hybrid electric vehicle according to various embodiments of the present invention.

Referring to FIG. 3, neither of the first nor second clutches CL1 and CL2 is operated at the EV mode.

The engine ENG is stopped and the planetary gear set PG is not directly related to shift at the EV mode. In addition, electrically continuously variable shift may be achieved by controlling the output of the second motor/generator MG2 directly connected to the output gear OG.

That is, the torque of the second motor/generator MG2 is transmitted to the final reduction gear FG of the differential apparatus DIFF through the output gear OG, the intermediate gear CG, and the driving gear DG, and then drives the driving wheels FW through the drive shaft DS.

Figure 4:
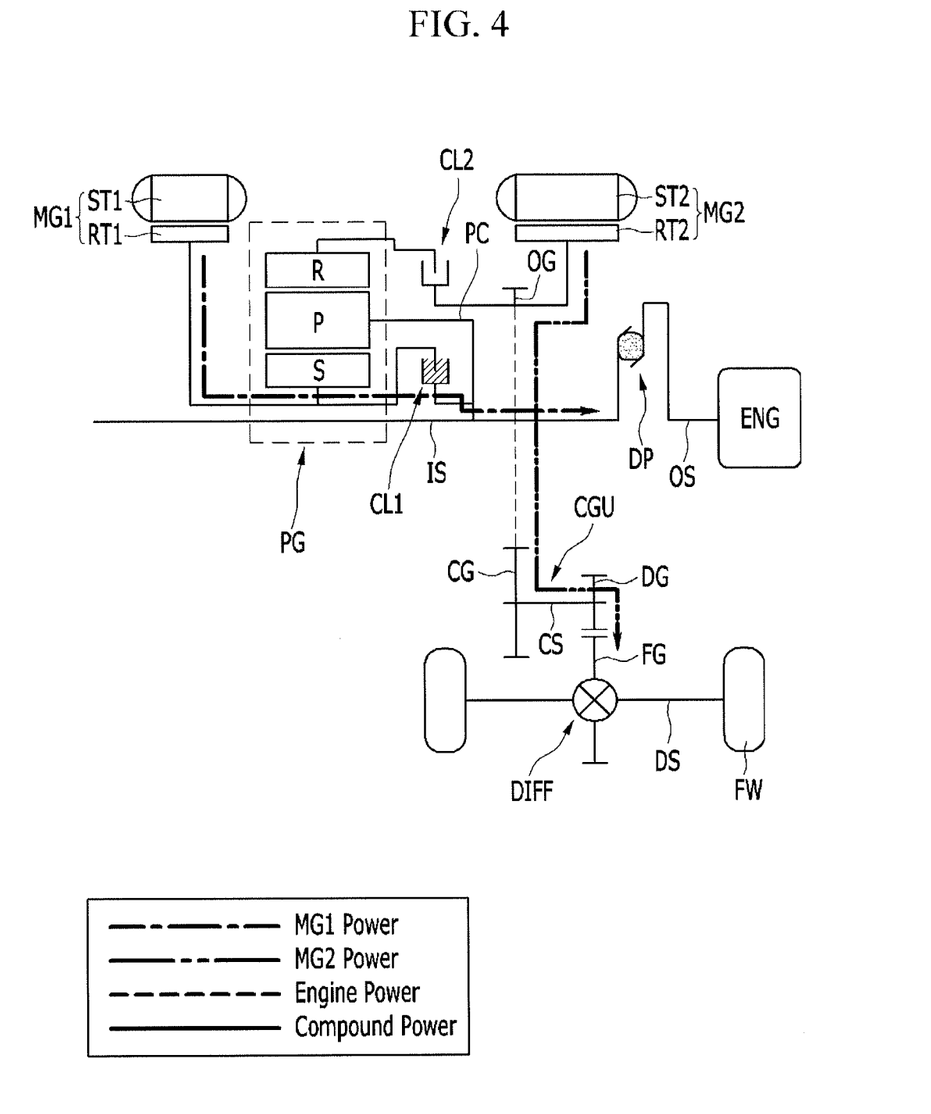
FIG. 4 is a schematic diagram for illustrating flow of power when starting an engine in an exemplary transmission system of the hybrid electric vehicle according to the present invention.

FIG. 4 is a schematic diagram for illustrating flow of power when starting an engine in a transmission system of the hybrid electric vehicle according to various embodiments of the present invention.

Referring to FIG. 4, if vehicle speed increases at the EV mode, the engine ENG is started. At this time, the first clutch CL1 is operated.

That is, the planetary gear set PG becomes a direct-coupling state by operation of the first clutch CL1 and the first motor/generator MG1 is operated so as to input the torque of the first motor/generator MG1 into the sun gear S of the planetary gear set PG in a state of the EV mode where the second motor/generator MG2 is operated. In this case, the planetary gear set PG rotates as one rotation member and starts the engine ENG through the input shaft IS.

After the engine ENG is started, the first motor/generator MG1 is stopped and the continuous mode begins.

Figure 5:
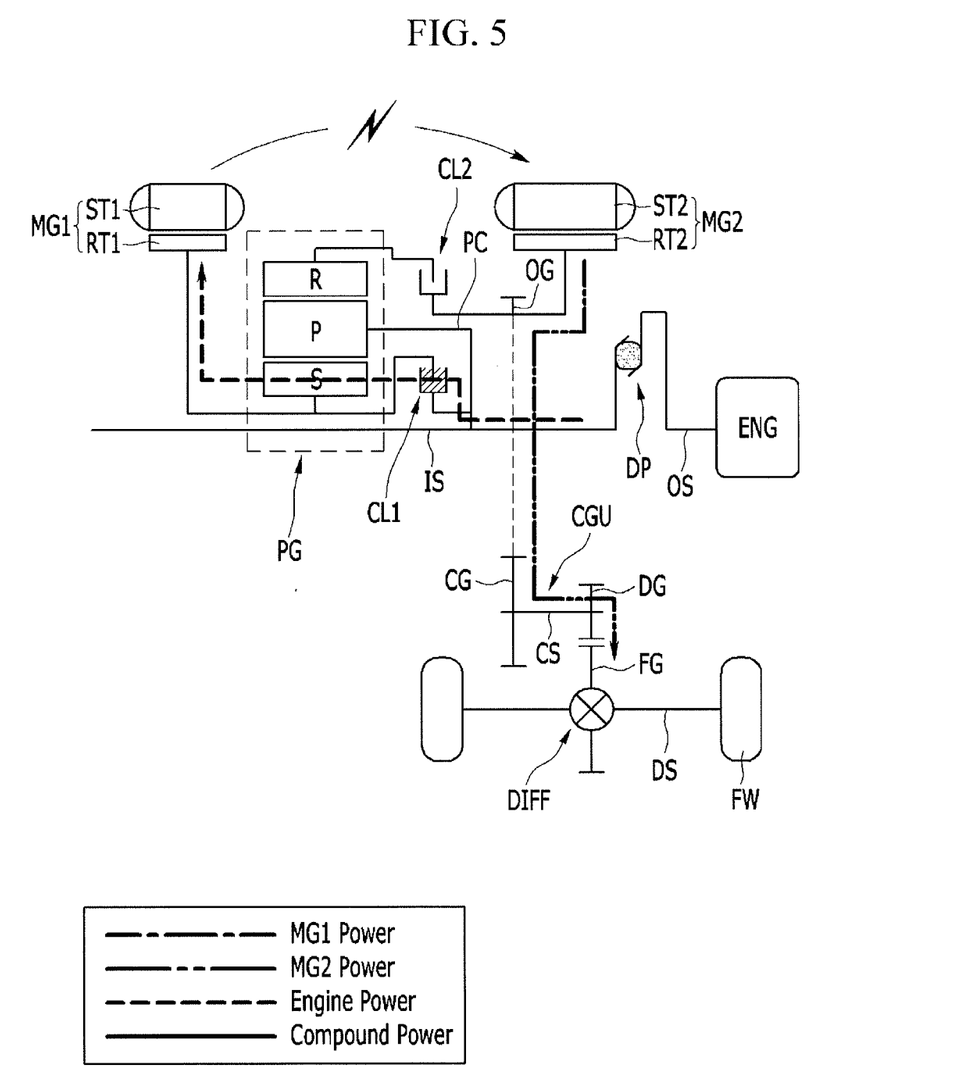
FIG. 5 is a schematic diagram for illustrating flow of power at continuous mode in an exemplary transmission system of the hybrid electric vehicle according to the present invention.

FIG. 5 is a schematic diagram for illustrating flow of power at continuous mode in a transmission system of the hybrid electric vehicle according to various embodiments of the present invention.

Referring to FIG. 5, the first clutch CL1 is operated at the continuous mode.

If the engine ENG is driven at the EV mode, the torque of the engine ENG is transmitted to the first motor/generator MG1 and electrical energy generated by the first motor/generator MG1 is supplied to the second motor/generator MG2 as driving power. Therefore, the continuous mode is achieved. The torque of the engine ENG is not used to drive the driving wheels FW directly but is used to cause the first motor/generator MG1 to generate electric energy at the continuous mode.

In a state that the second motor/generator MG2 and the engine ENG are operated, the planetary gear set PG becomes the direct-coupling state by operation of the first clutch CL1 at the continuous mode.

Therefore, if the torque of the engine ENG is input to the sun gear S of the planetary gear set PG through the input shaft IS, the planetary gear set PG rotates as the one rotation member and causes the first motor/generator MG1 to generate electric energy.

That is, electrically continuously variable shift may be achieved by controlling the output of the second motor/generator MG2 and the vehicle can run by the torque of the second motor/generator MG2 at the continuous mode. In addition, the electrical energy generated by the first motor/ generator MG1 is used as the driving power of the second motor/generator MG2 and remaining electric energy charges the battery.

Figure 6:
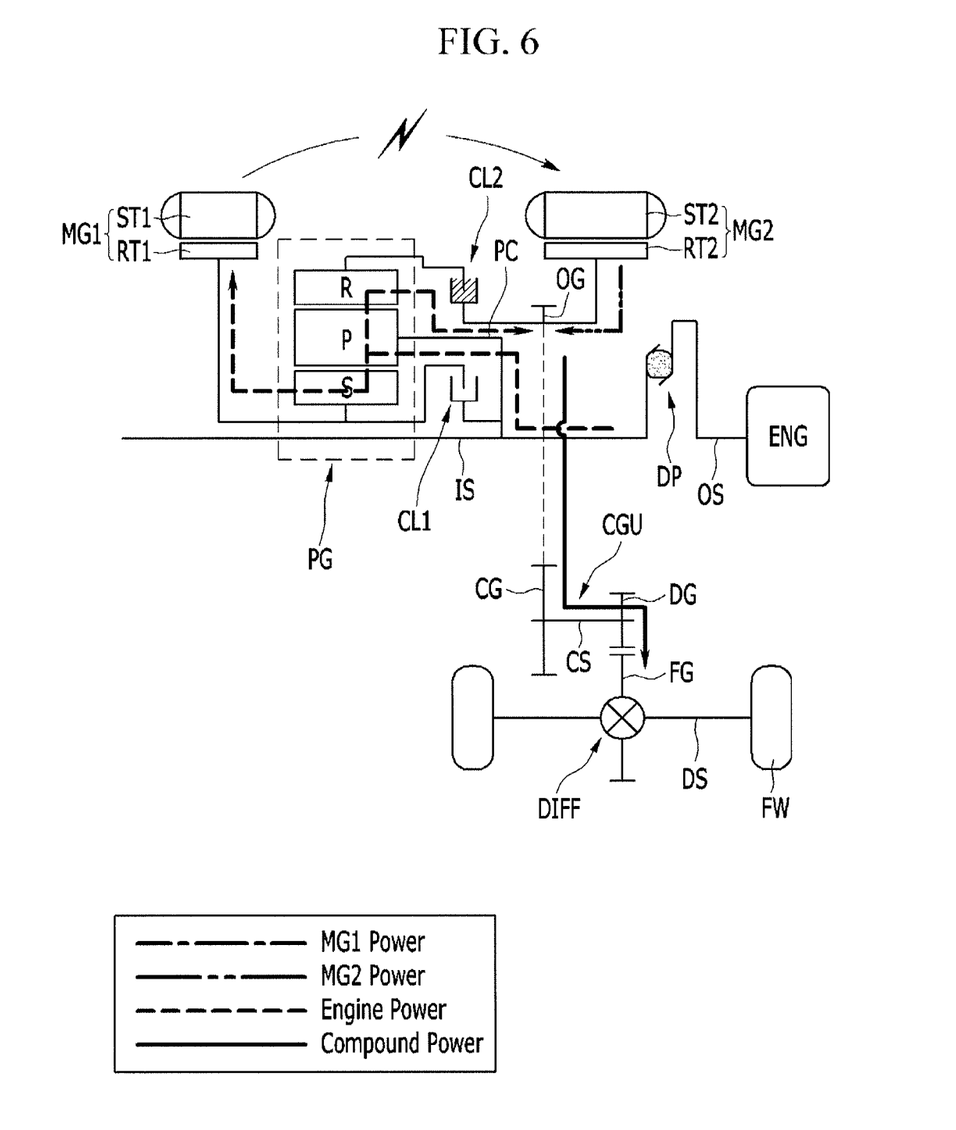
FIG. 6 is a schematic diagram for illustrating flow of power at power split mode in an exemplary transmission system of the hybrid electric vehicle according to the present invention.

FIG. 6 is a schematic diagram for illustrating flow of power at power split mode in a transmission system of the hybrid electric vehicle according to various embodiments of the present invention.

Referring to FIG. 6, the second clutch CL2 is operated at the power split mode.

The torque of the engine ENG is used as main power and the torque of the second motor/generator MG2 is used as auxiliary power at the power split mode.

That is, the torque of the engine ENG is input to the planetary gear set PG through the input shaft IS and the planet carrier PC, a portion of the torque input to the planetary gear set PG is transmitted to the first motor/generator MG1 through the sun gear S, and the other portion of the torque is transmitted to the output gear OG through the ring gear R by operation of the second clutch CL2. Simultaneously, the torque of the second motor/generator MG2 is transmitted to the output gear OG as auxiliary power.

At this time, a portion of the torque of the engine ENG may be involved in the power generation of the first motor/generator MG1. That is, the first motor/generator MG1 generates electric energy by the torque of the engine ENG transmitted through the planetary gear set PG, and the generated electrical energy is supplied to the second motor/generator MG2 as driving power. In addition, remaining electric energy charges the battery.

At the power split mode, electrically continuously variable shift may be achieved by the torque of the engine ENG transmitted to the output gear OG through the ring gear R, and the torque of the second motor/generator MG2 directly transmitted to the output gear OG.

The torques of the engine ENG and the second motor/generator MG2 transmitted to the output gear OG is transmitted to the final reduction gear FG of the differential apparatus DIFF through the intermediate gear CG and the driving gear DG, and drives the driving wheels FW.

Figure 7:
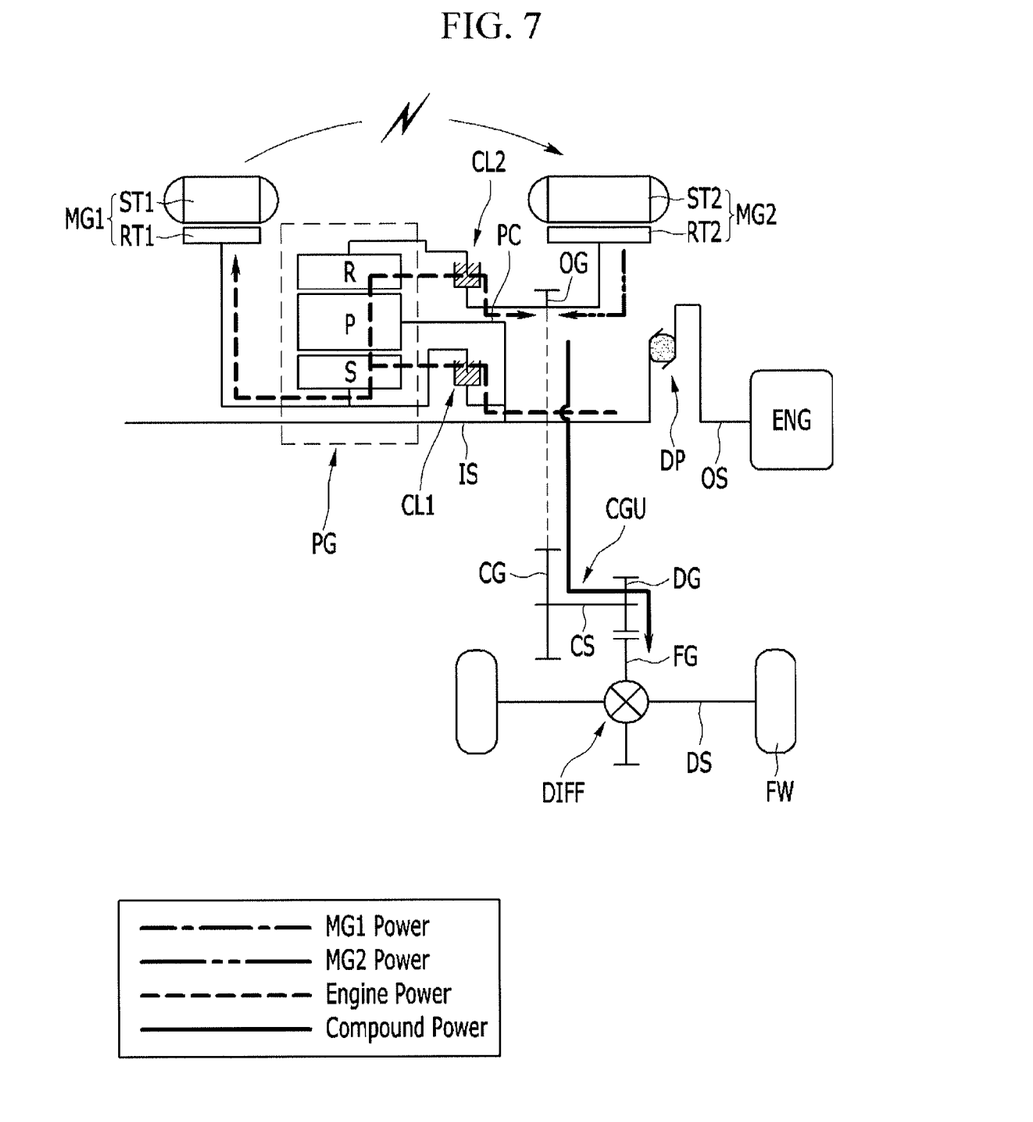
FIG. 7 is a schematic diagram for illustrating flow of power at parallel mode in an exemplary transmission system of the hybrid electric vehicle according to the present invention.

FIG. 7 is a schematic diagram for illustrating flow of power at parallel mode in a transmission system of the hybrid electric vehicle according to various embodiments of the present invention.

Referring to FIG. 7, both of the first and second clutches CL1 and CL2 are operated at the parallel mode.

The torque of the engine ENG is used as main power and the torque of the second motor/generator MG2 is used as auxiliary power at the parallel mode.

That is, the torque of the engine ENG is transmitted to the output gear OG through the input shaft IS, the planetary gear set PG, and the second clutch CL2 as the main power, and the torque of the second motor/generator MG2 is transmitted to the output gear OG as the auxiliary power in a state that the planetary gear set PG is the direct-coupling state by operation of the first clutch CL1.

At this time, a portion of the torque of the engine ENG is involved in the power generation of the first motor/generator MG1. That is, the first motor/generator MG1 generates electric energy by the torque of the engine ENG transmitted through the planetary gear set PG, and the generated electric energy is supplied to the second motor/generator MG2 as the driving power. In addition, remaining electric energy charges the battery.

At the parallel mode, electrically continuously variable shift may be achieved by the torque of the engine ENG transmitted to the output gear OG through the input shaft IS and the planetary gear set PG, and the torque of the second motor/generator MG2 directly transmitted to the output gear OG.

The torques of the engine ENG and the second motor/generator MG2 transmitted to the output gear OG is transmitted to the final reduction gear FG of the differential apparatus DIFF through the intermediate gear CG and the driving gear DG, and drives the driving wheels FW.

Figure 8:
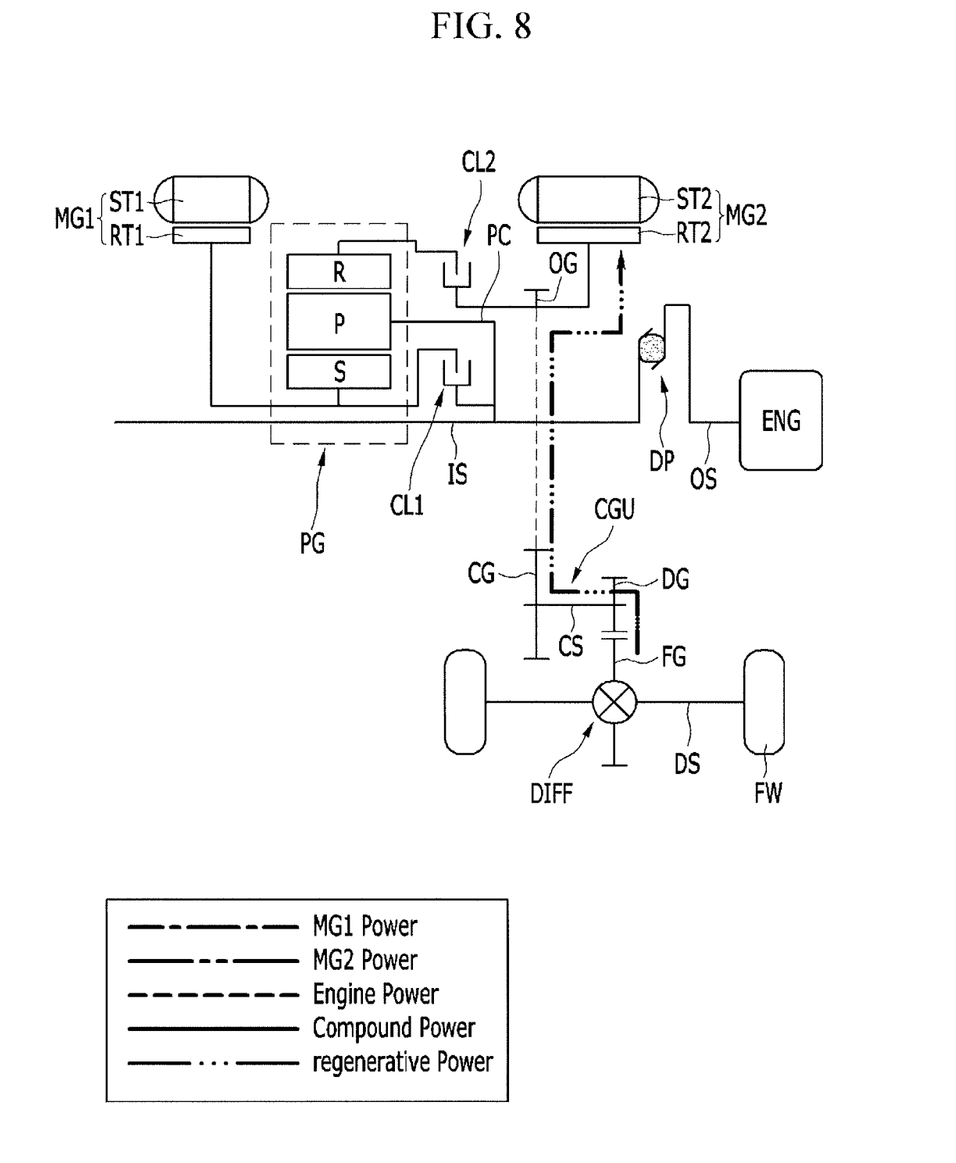
FIG. 8 is a schematic diagram for illustrating flow of power at regenerative braking mode in an exemplary transmission system of the hybrid electric vehicle according to the present invention.

FIG. 8 is a schematic diagram for illustrating flow of power at regenerative braking mode in a transmission system of the hybrid electric vehicle according to various embodiments of the present invention.

Referring to FIG. 8 neither of the first nor second clutches CL1 and CL2 is operated at the regenerative braking mode.

That is, regenerative power input from the driving wheels FW is transmitted to the second motor/generator MG2 through the final reduction gear FG of the differential apparatus DIFF, the driving gear DG, the intermediate gear CG, and the output gear OG and causes the second motor/generator MG2 to generate electric energy at the regenerative braking mode.

As described above, all of the engine ENG, the first motor/generator MG1 and the second motor/generator MG2 can generate driving torque, the first motor/generator MG1 can generate electricity by using the torque of the engine ENG, and continuous gear ratios required in the vehicle can be formed by control of the second motor/generator MG2 in a transmission system of the hybrid electric vehicle according to various embodiments of the present invention. Therefore, fuel economy may be improved.

That is, the EV mode and the power split mode having high efficiency at low-speed driving, the parallel mode having high efficiency at high-speed driving, and the continuous mode suitable to a plug-in hybrid electric vehicle can be achieved by disposing two motor/generators MG1 and MG2 and two clutches CL1 and CL2 on the input shaft IS. Therefore, fuel economy may be further enhanced.

In addition, since control of the clutches is minimized at modes other than the parallel mode, operating pressure applied to the clutches can be minimized and fuel economy may be improved.

In addition, since the parallel mode is achieved, use of the continuous mode at high-speed driving may not be necessary. Therefore, fuel economy may be enhanced and capacity of the second motor/generator MG2 may be reduced.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A transmission system of a hybrid electric vehicle comprising:
   an input shaft arranged to receive torque of an engine;
   a first motor/generator operable as a motor or a generator;
   a second motor/generator operable as a motor or a generator and directly connected to an output gear; and a planetary gear set including:
- a first rotation element directly connected to the first motor/generator and selectively connected to the input shaft;
- a second rotation element directly connected to the input shaft; and
- a third rotation element selectively connected to the output gear.

2. The transmission system of claim 1, further comprising a first clutch disposed between the first rotation element of the planetary gear set and the input shaft and selectively connecting the first rotation element to the input shaft.

3. The power transmission system of claim 1, further comprising a second clutch disposed between the third rotation element and the output gear and selectively connecting the third rotation element to the output gear.

4. The transmission system of claim 1,
wherein the planetary gear set is a single pinion planetary gear set, and
wherein the first rotation element is a sun gear, the second rotation element is a planet carrier, and the third rotation element is a ring gear.

5. The transmission system of claim 1, further comprising a reduction gear unit including:
- an intermediate shaft disposed in parallel with the input shaft;
- an intermediate gear fixedly disposed on the intermediate shaft and engaged with the output gear; and
- a driving gear fixedly disposed on the intermediate shaft and engaged with a final reduction gear of a differential apparatus.

6. The transmission system of claim 1, wherein a torsion damper is disposed between the engine and the input shaft.

7. The transmission system of claim 5, wherein the reduction gear unit is configured to decelerate torque transmitted to the intermediate gear and to transmit the decelerated torque to the differential apparatus.

8. A transmission system of a hybrid electric vehicle comprising:
- an input shaft arranged to receive torque of an engine;
- a first motor/generator operable as a motor or a generator;
- a second motor/generator operable as a motor or a generator and directly connected to an output gear;
- a planetary gear set including:
  - a sun gear directly connected to the first motor/generator and selectively connected to the input shaft;
  - a planet carrier directly connected to the input shaft; and
  - a ring gear selectively connected to the output gear; and
- a reduction gear unit transmitting torque transmitted to the output gear to a differential apparatus.

9. The transmission system of claim 8, further comprising a first clutch disposed between the sun gear and the input shaft and selectively connecting the sun gear to the input shaft.

10. The transmission system of claim 8, further comprising a second clutch disposed between the ring gear and the output gear and selectively connecting the ring gear to the output gear.

11. The transmission system of claim 8, wherein the reduction gear unit comprises:
- an intermediate shaft disposed in parallel with the input shaft;
- an intermediate gear fixedly disposed on the intermediate shaft and engaged with the output gear; and
- a driving gear fixedly disposed on the intermediate shaft and engaged with a final reduction gear of a differential apparatus.

12. The transmission system of claim 8, wherein a torsion damper is disposed between the engine and the input shaft.

13. The transmission system of claim 11, wherein the reduction gear unit is configured to decelerate torque transmitted to the intermediate gear and to transmit the decelerated torque to the differential apparatus.

* * * * *